United States Patent
Ishibashi et al.

(10) Patent No.: US 10,796,807 B2
(45) Date of Patent: Oct. 6, 2020

(54) NUCLEAR REACTOR FUEL ROD AND FUEL ASSEMBLY HAVING BUNDLED SAME

(71) Applicant: HITACHI, LTD., Tokyo (JP)

(72) Inventors: Ryou Ishibashi, Tokyo (JP); Kinya Aota, Tokyo (JP); Xudong Zhang, Tokyo (JP); Hideki Kita, Nagoya (JP); Seiji Yamashita, Nagoya (JP)

(73) Assignee: HITACHI, LTD., Tokyo (JP)

( * ) Notice: Subject to any disclaimer, the term of this patent is extended or adjusted under 35 U.S.C. 154(b) by 304 days.

(21) Appl. No.: 15/529,663

(22) PCT Filed: Nov. 26, 2014

(86) PCT No.: PCT/JP2014/081175
§ 371 (c)(1),
(2) Date: May 25, 2017

(87) PCT Pub. No.: WO2016/084146
PCT Pub. Date: Jun. 2, 2016

(65) Prior Publication Data
US 2017/0330638 A1 Nov. 16, 2017

(51) Int. Cl.
*G21C 1/04* (2006.01)
*G21C 3/322* (2006.01)
(Continued)

(52) U.S. Cl.
CPC ............ *G21C 3/322* (2013.01); *B23K 1/0008* (2013.01); *B23K 1/18* (2013.01); *B23K 1/19* (2013.01);
(Continued)

(58) Field of Classification Search
CPC ... G21C 3/00; G21C 3/02; G21C 3/04; G21C 3/06; G21C 3/10
See application file for complete search history.

(56) References Cited

U.S. PATENT DOCUMENTS

| 4,751,044 A | 6/1988 | Hwang et al. |
| 2006/0039524 A1 | 2/2006 | Feinroth et al. |

(Continued)

FOREIGN PATENT DOCUMENTS

| JP | H62-039787 A | 2/1987 |
| JP | H05-180986 A | 7/1993 |

(Continued)

OTHER PUBLICATIONS

Y. Katou et al. Status of High Flux Isotope Reactor Irradiation of Silicon Carbide/Silicon Carbide Joints ORNL/TM-2014/513 (2014).

(Continued)

*Primary Examiner* — Marshall P O'Connor
(74) *Attorney, Agent, or Firm* — Volpe and Koenig, P.C.

(57) ABSTRACT

A nuclear reactor fuel rod is a fuel rod for a light-water reactor. The nuclear reactor fuel rod includes a fuel cladding tube and an end plug, both of which are formed of a silicon carbide material. A bonding portion between the fuel cladding tube and the end plug is formed by brazing with a predetermined metal bonding material interposed, and/or by diffusion bonding. The predetermined metal bonding material has a solidus temperature of 1200° C. or higher. An outer surface of the bonding portion, and a portion of an outer surface of the fuel cladding tube and the end plug, which is adjacent to the outer surface of the bonding portion are covered by bonding-portion coating formed of a predetermined coating metal. The predetermined metal bonding material and the predetermined coating metal have an average linear expansion coefficient which is less than 10 ppm/K.

26 Claims, 7 Drawing Sheets

(51) Int. Cl.
  *G21C 3/10*    (2006.01)
  *G21C 21/02*   (2006.01)
  *G21C 3/07*    (2006.01)
  *B23K 20/233*  (2006.01)
  *B23K 1/19*    (2006.01)
  *C04B 37/00*   (2006.01)
  *B23K 1/18*    (2006.01)
  *B23K 20/02*   (2006.01)
  *B23K 20/16*   (2006.01)
  *B23K 1/00*    (2006.01)
  *G21C 5/12*    (2006.01)
  *G21C 15/243*  (2006.01)
  *G21C 3/326*   (2006.01)
  *B23K 101/06*  (2006.01)
  *B23K 103/00*  (2006.01)

(52) U.S. Cl.
  CPC ............ *B23K 20/026* (2013.01); *B23K 20/16* (2013.01); *B23K 20/233* (2013.01); *C04B 37/006* (2013.01); *G21C 3/07* (2013.01); *G21C 3/10* (2013.01); *G21C 5/126* (2013.01); *G21C 15/243* (2013.01); *G21C 21/02* (2013.01); *B23K 2101/06* (2018.08); *B23K 2103/52* (2018.08); *C04B 2235/9607* (2013.01); *C04B 2235/9669* (2013.01); *C04B 2237/083* (2013.01); *C04B 2237/122* (2013.01); *C04B 2237/126* (2013.01); *C04B 2237/127* (2013.01); *C04B 2237/16* (2013.01); *C04B 2237/365* (2013.01); *C04B 2237/38* (2013.01); *C04B 2237/708* (2013.01); *C04B 2237/72* (2013.01); *C04B 2237/765* (2013.01); *C04B 2237/84* (2013.01); *G21C 3/326* (2013.01); *Y02E 30/30* (2013.01)

(56) References Cited

U.S. PATENT DOCUMENTS

2013/0075039 A1    3/2013  Herderick et al.
2014/0153688 A1*   6/2014  Zabiego ............... C04B 37/021
                                                    376/409

FOREIGN PATENT DOCUMENTS

JP    H06-174873 A      6/1994
JP    2008-501977 A     1/2008
JP    2012-233734 A     11/2012

OTHER PUBLICATIONS

International Search Report for WO/2016/084146 A1, dated Feb. 24, 2015.

* cited by examiner

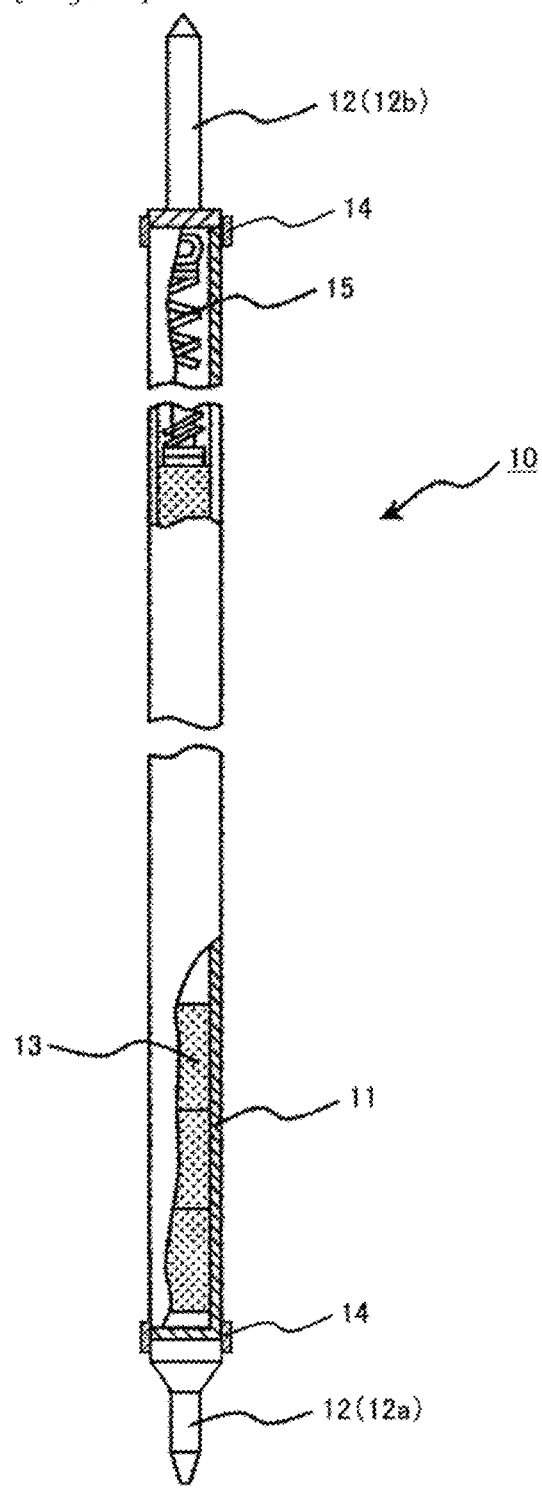

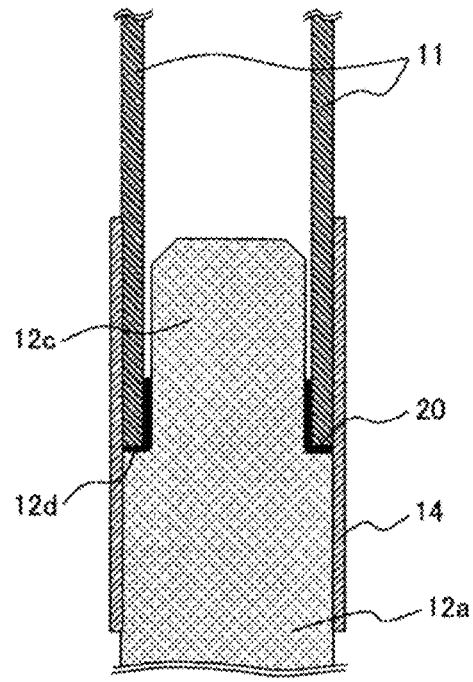
[Fig. 2A]
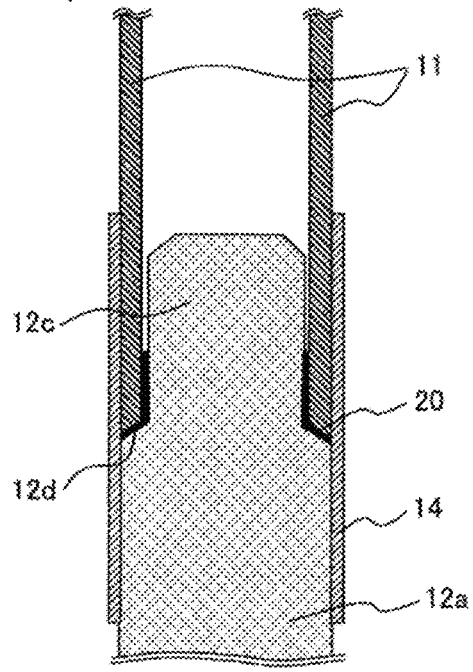
[Fig. 2B]

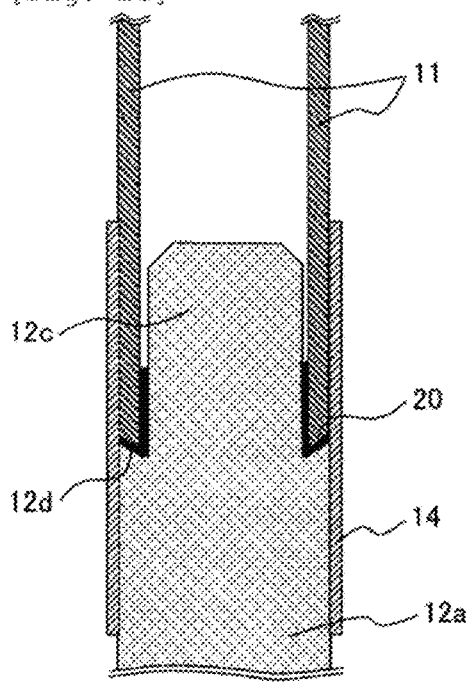
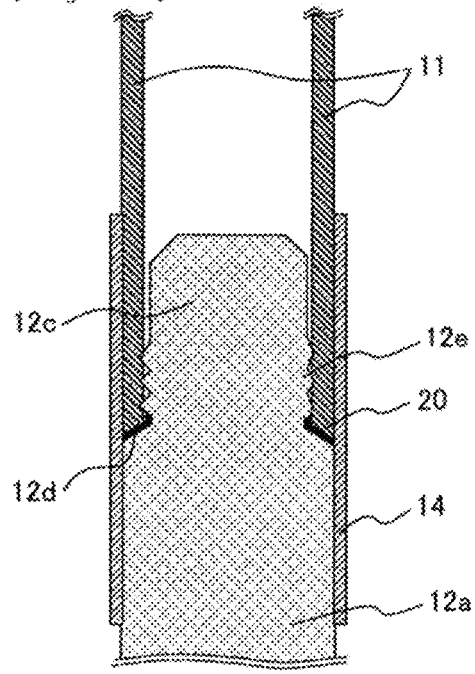

[Fig. 3]
(a)
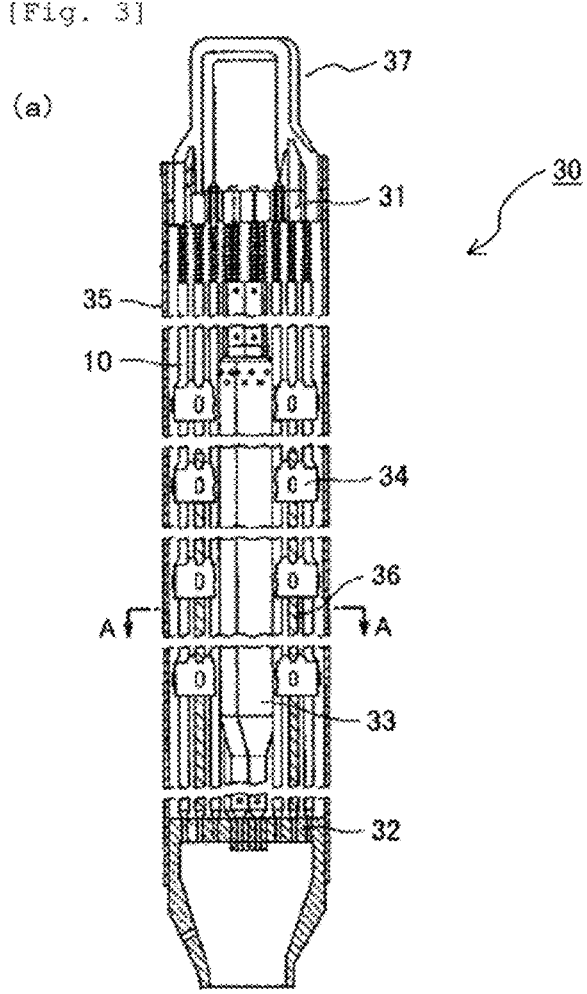
(b)
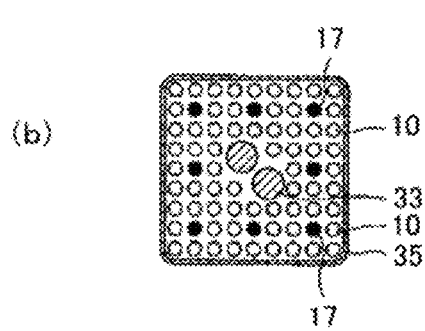

[Fig. 4]
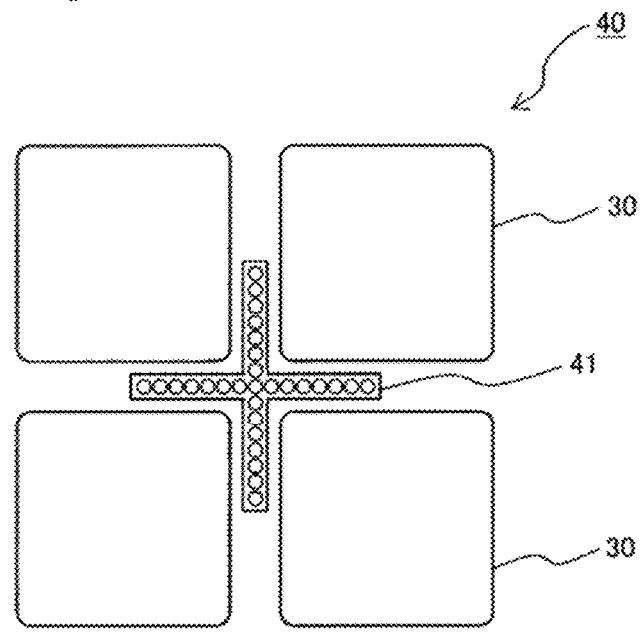

[Fig. 5]
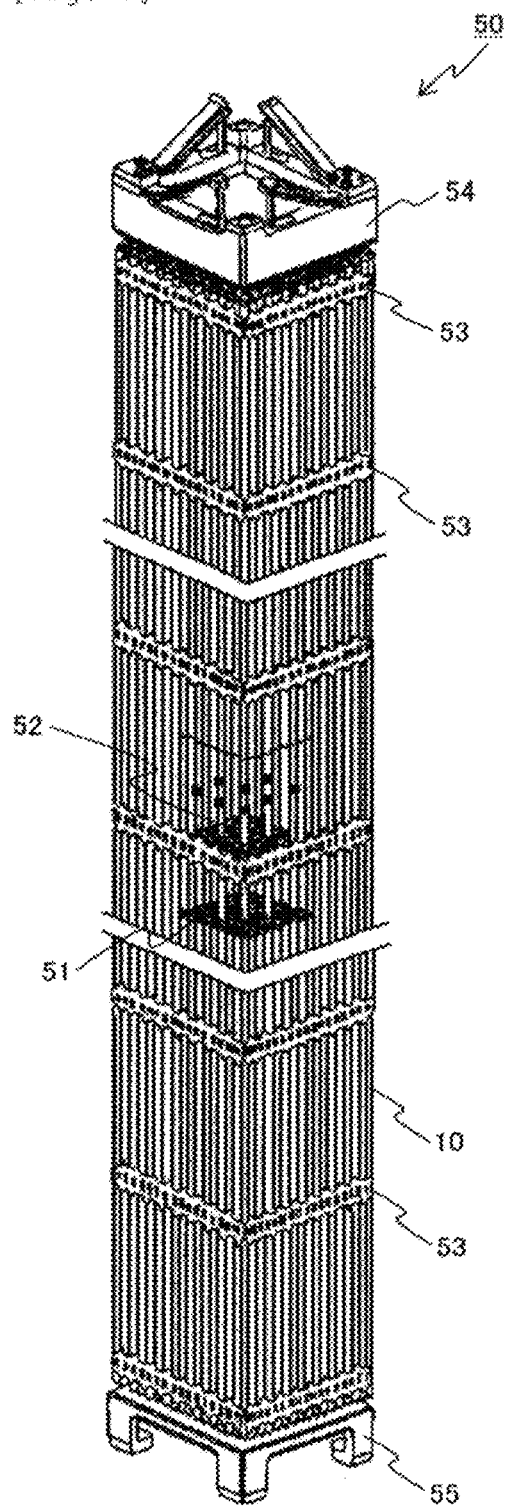

[Fig. 6]
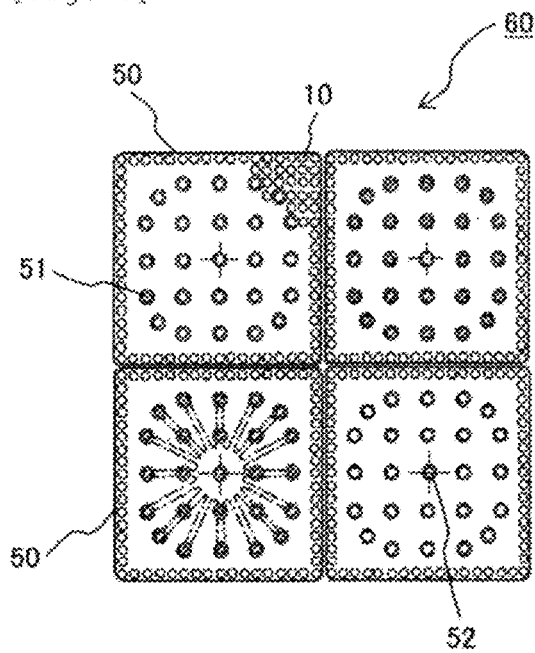
[Fig. 7]
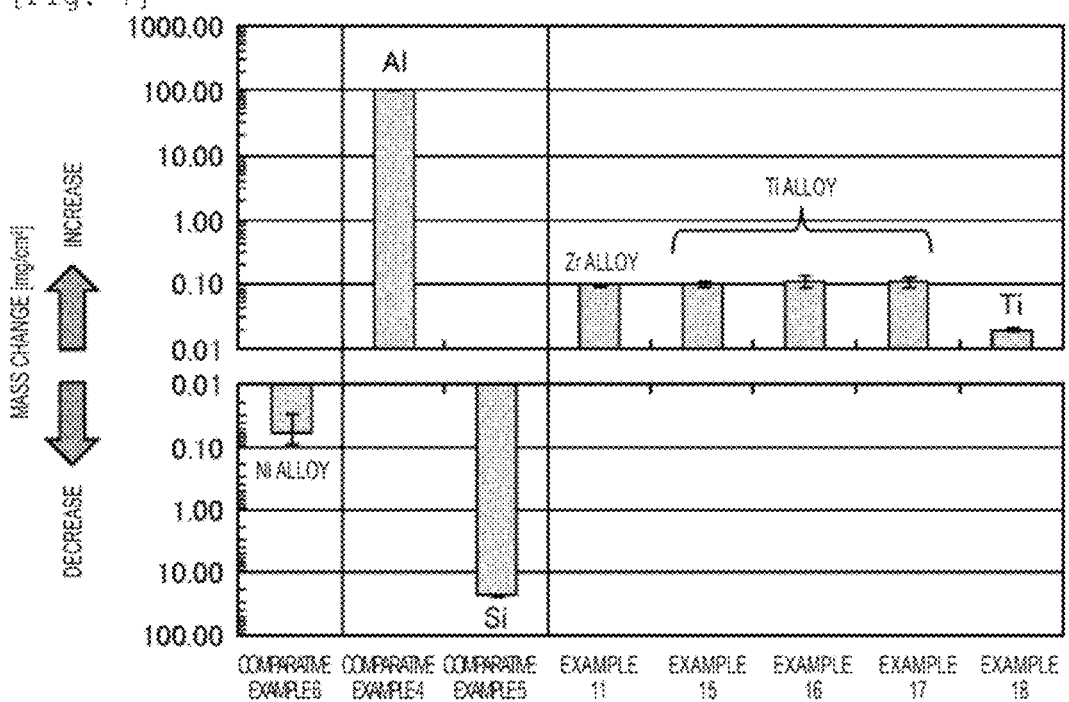

NUCLEAR REACTOR FUEL ROD AND FUEL ASSEMBLY HAVING BUNDLED SAME

TECHNICAL FIELD

The present invention relates to a technology of a nuclear reactor and particularly, to a nuclear reactor fuel rod loaded in a reactor core of a nuclear reactor and a fuel assembly in which nuclear reactor fuel rods are bundled.

BACKGROUND ART

Generally, a fuel assembly is loaded as a nuclear reactor fuel, in a reactor core of a light-water reactor such as a boiling-water type nuclear reactor (BWR) or a pressurized-water type nuclear reactor (PWR). In the fuel assembly, plural pieces of nuclear reactor fuel rods (simply also referred to as a fuel rod) in which a uranium fuel is loaded are aligned and supported by an upper tie plate and a lower tie plate.

In each of the nuclear reactor fuel rods, a uranium fuel pellet is loaded in a fuel cladding tube having a length of about 4 m, and both ends thereof are sealed by end plugs. From the related art, a zirconium alloy (Zircaloy) in which an area of a thermal-neutron absorption cross-section is small and corrosion resistance is excellent has been used as materials of the fuel cladding tube and the end plugs. The zirconium alloy is excellent from a viewpoint of neutron economy and is safely used in an environment in the general nuclear reactor.

In a light-water reactor using water as a coolant, in a case where an accident (so-called loss-of-coolant accident) in which flowing of cooling water in a nuclear reactor is not possible occurs, heat is generated from uranium fuel, and thus the temperature in the nuclear reactor is increased, and water vapor of a high temperature is generated. If the insufficient cooling water causes the fuel rod to be exposed from the cooling water, the temperature of the fuel rod is increased, and easily exceeds 1000° C. The zirconium alloy of the fuel cladding tube chemically reacts with water vapor (zirconium alloy is oxidized and water vapor is reduced), and thus hydrogen is generated. Generation of a large amount of the water vapor and hydrogen is a phenomenon to be strictly avoided because of causing an explosion accident.

In order to avoid loss of the coolant or an accident such as explosion, in the current nuclear reactor, a system design in which multiple types of power supply devices and cooling devices such as an emergency power source, and an emergency reactor-core cooling device are provided, and thus safety is improved is made, and more improvement and modification is also performed. An attempt to improve safety is not limited to system design, and a material forming a reactor core is also examined for improving safety.

For example, as materials of a fuel cladding tube or an end plug, an examination using a ceramics material instead of the zirconium alloy which is the cause of generation of hydrogen is in progress. Among the materials, because silicon carbide (SiC) has excellent corrosion resistance, high thermal conductivity, and a small area of a thermal-neutron absorption cross-section, research and development for silicon carbide as a promising material of the fuel cladding tube and the end plug is making progress. An oxidation rate of SiC in an environment of a high-temperature water vapor, for example, a temperature being higher than 1300° C. is lower than that of a zirconium alloy by double digits. Thus, even though a loss-of-coolant accident occurs, it can be expected that the amount of generated hydrogen is significantly reduced.

In a case where the ceramics material is used as the materials of a fuel cladding tube and an end plug, there is a fault in that, when an end portion of a fuel rod is sealed by the end plug, easy bonding by welding as with a metal material is not possible. In particular, in end plug bonding after a fuel pellet is loaded, employing a bonding method of heating the entirety of the fuel rod is not possible. Thus, it is necessary that a bonding portion is locally heated so as to be bonded. However, generally, the ceramics material is easily broken by thermal stress. Thus, locally-applying a large quantity of heat is not preferable. Because changing of a material from a zirconium alloy is premised, it is not desirable that dimensions of the fuel cladding tube and the end plug (that is, dimensions as the fuel rod) are changed largely.

To solve the above-described fault, various technologies are developed and proposed. For example, PTL 1 (US 2013/0075039) discloses a system for producing a silicon carbide assembly. Two types or more of silicon carbide materials, one or more intermediate bonding layers arranged between the silicon carbide materials, and one or more devices configured to apply energy to the intermediate bonding layer are provided. The intermediate bonding layer contains a first material melted at a first temperature, and a second material which is dispersed in the entirety of the first material and is melted at a second temperature lower than that of the first material. The device is operated in a manner that the device applies energy to the intermediate bonding layer so as to soften the first material and melt the second material. Softening the first material and melting the second material cause the intermediate bonding layer to be transformed to be an adhesive material which substantially has no pore. Thus, the device is operated to integrally bonding two types or more of silicon carbide materials to each other. In addition, PTL 1 discloses that the intermediate bonding layer contains an aluminum-silicon (Al—Si) alloy.

PTL 2 (JP-A-2012-233734) discloses a fuel cladding tube bonded body in which an end plug is bonded to an end portion of a fuel cladding tube in which a fuel pellet is inserted into an inner surface and an outer surface is in contact with reactor water, and thus the fuel pellet is sealed. Both the fuel cladding tube and the end plug are formed by a silicon-carbide fiber reinforced composite material reinforced with silicon carbide fiber. At least a portion which is in contact with the reactor water, among portions at which the fuel cladding tube and the end plug are bonded to each other is directly bonded without interposing a different material. In addition, a fuel cladding tube bonded body in which a portion on a side of being in contact with the reactor water among portions at which the fuel cladding tube and the end plug are bonded to each other is directly bonded without interposing a different material, and another side of not being in contact with the reactor water is bonded with a different material (mixture of titanium silicon carbide and titanium silicide, or silicon carbide containing aluminum and yttrium) interposed is disclosed.

CITATION LIST

Patent Literature

PTL 1: US Publication Application No. 2013/0075039
PTL 2: JP-A-2012-233734

SUMMARY OF INVENTION

Technical Problem

Originally, a fuel rod is used for sealing a radioactive substance (fuel pellet or fission product) not to be leaked outwardly. Ensuring air tightness at a bonding portion between the fuel cladding tube and the end plug is a necessary requirement. In this viewpoint, it is considered that a liquid phase welding method (for example, brazing) is advantageous. It is expected that the technology disclosed in PTL 1 has appropriate air tightness, by using a liquid phase welding method.

In a case where an occurrence of the loss-of-coolant accident is assumed, a fuel rod includes a bonding portion, and thus heat resistance which stands at least 1200° C. is required. A metal-silicon alloy (metal silicide) is used as one of bonding materials having a high melting point. The technology in PTL 1 uses the metal silicide. However, an Al—Si alloy used in PTL 1 is easily dissolved in reactor water (for example, reactor water of 280° C. to 330° C.) under an environment in which a nuclear reactor normally operates, or is easily rusted by the reactor water. Thus, if an Al—Si alloy brazing material is brought into contact with reactor water, another problem that durability of a bonding portion is largely degraded occurs.

In the technology in PTL 2, in order that corrosion and deterioration of a brazing material occurring by contact with reactor water is avoided, solid-state bonding is performed without a bonding material interposed, in an outer circumferential region of a bonding portion, which comes into contact with the reactor water, and diffusion bonding is performed with a bonding material interposed, in an inner circumferential region of the bonding portion. However, the thickness of a fuel cladding tube is about 1 mm, and it is not technically easy that solid-state bonding and diffusion bonding are performed properly in the thickness. Further, it is technically difficult that air tightness is totally secured between SiCs by solid-state bonding. As a result, it is concerned that a fuel rod obtained by using the technology in PTL 2 has producing yield and/or long-term reliability which are significantly reduced.

Accordingly, to solve the above problems, an object of the invention is to provide a nuclear reactor fuel rod in which a SiC material is used as materials of a fuel cladding tube and an end plug, and air tightness, heat resistance, and corrosion resistance are provided at a bonding portion between the fuel cladding tube and the end plug, and to provide a fuel assembly in which nuclear reactor fuel rods are bundled.

Solution to Problem (I) According to an aspect of the invention, there is provided a nuclear reactor fuel rod for a light-water reactor. The nuclear reactor fuel rod includes a fuel cladding tube and an end plug, both of which are formed of a silicon carbide material. A bonding portion between the fuel cladding tube and the end plug is formed by brazing with a predetermined metal bonding material interposed, and/or by diffusion bonding. The predetermined metal bonding material has a solidus temperature of 1200° C. or higher. An outer surface of the bonding portion, and a portion of an outer surface of the fuel cladding tube and the end plug, which is adjacent to the outer surface of the bonding portion are covered by a bonding-portion coating formed of a predetermined coating metal. The predetermined metal bonding material and the predetermined coating metal have an average linear expansion coefficient which is less than 10 ppm/K.

In the invention, in the nuclear reactor fuel rod (I) according to the invention, the following improvement or changes may be added.

(i) The predetermined metal bonding material is one selected from silicon (Si), a Si alloy, titanium (Ti), a Ti alloy, zirconium (Zr), and a Zr alloy. The predetermined coating metal is one selected from titanium, a titanium alloy, zirconium, and a zirconium alloy.

(ii) The thickness of the bonding-portion coating is 0.1 mm to 1 mm.

(iii) The silicon carbide material is a silicon carbide fiber-reinforced silicon carbide composite material obtained by composing silicon carbide fiber in a matrix of silicon carbide.

(iv) The silicon carbide material is a material in which a silicon carbide layer is further formed at a portion of a surface of the silicon carbide fiber-reinforced silicon carbide composite material.

(v) A butting surface between the fuel cladding tube and the end plug at the bonding portion is formed to cause a direction paralleled with the butting surface to be inclined to an axial direction of the fuel cladding tube at an angle of 5° to 60°.

(vi) The fuel cladding tube and the end plug are fastened further by a screw structure.

(II) According to another aspect of the invention, there is provided a fuel assembly configured by bundling a plurality of nuclear reactor fuel rods. The nuclear reactor fuel rod is the nuclear reactor fuel rod according to the above invention.

Advantageous Effects of Invention

According to the invention, it is possible to provide a nuclear reactor fuel rod in which a SiC material is used as materials of a fuel cladding tube and an end plug, and air tightness, heat resistance, and corrosion resistance are provided at a bonding portion between the fuel cladding tube and the end plug, and to provide a fuel assembly in which nuclear reactor fuel rods are bundled.

BRIEF DESCRIPTION OF DRAWINGS

FIG. 1 is a schematic diagram of a partial section illustrating an example of a nuclear reactor fuel rod according to the invention.

FIG. 2A is a schematic diagram of an enlarged section illustrating an example of a bonding portion between a fuel cladding tube and an end plug.

FIG. 2B is a schematic diagram of an enlarged section illustrating another example of the bonding portion between the fuel cladding tube and the end plug.

FIG. 2C is a schematic diagram of an enlarged section illustrating still another example of the bonding portion between the fuel cladding tube and the end plug.

FIG. 2D is a schematic diagram of an enlarged section illustrating still another example of the bonding portion between the fuel cladding tube and the end plug.

FIG. 3 is a schematic diagram illustrating an example of a fuel assembly according to the invention; FIG. 3(a) illustrates a longitudinal section, and FIG. 3(b) illustrates a cross-section of line A-A.

FIG. 4 is a schematic diagram of a cross-section illustrating an example of a cell of a boiling-water type nuclear reactor.

FIG. 5 is a perspective schematic diagram illustrating another example of the fuel assembly according to the invention.

FIG. 6 is a schematic diagram of a cross-section illustrating an example of a cell of a pressurized-water type nuclear reactor.

FIG. 7 is a graph illustrating results of a high-temperature water corrosion test in Comparative Examples 4 to 6 and Examples 11 and 15 to 18.

DESCRIPTION OF EMBODIMENTS

Hereinafter, an embodiment according to the invention will be specifically described with reference to the drawings. Similar members or portions are denoted by the same reference signs, and descriptions thereof will be not repeated. The invention is not limited to an embodiment which will be described here, and may be appropriately combined or improved in a range without departing from the technical ideas of the invention.

(Nuclear Reactor Fuel Rod)

FIG. 1 is a schematic diagram of a partial section illustrating an example of a nuclear reactor fuel rod according to the invention. As illustrated in FIG. 1, a nuclear reactor fuel rod 10 according to the invention includes a fuel cladding tube 11 and end plugs 12 (12a and 12b). The end plugs 12 are bonded to both ends of the fuel cladding tube 11 so as to seal the fuel cladding tube 11. A plurality of fuel pellets 13 is loaded in the fuel cladding tube 11. One end portion of the fuel pellets 13 which are continuously loaded is pressed by a plenum spring 15, in order to fix the fuel pellets 13. The surrounding of a bonding portion between the fuel cladding tube 11 and the end plug 12 is covered by a bonding-portion coating 14.

FIG. 2A is a schematic diagram of an enlarged section illustrating an example of a bonding portion between a fuel cladding tube and an end plug. FIG. 2A illustrates a bonding portion between the fuel cladding tube 11 and the end plug 12a, as the representative of the bonding portion. However, a bonding portion between the fuel cladding tube 11 and the end plug 12b has the similar structure. For simple illustration, the fuel pellet 13 is not illustrated.

In the invention, the fuel cladding tube 11 and the end plug 12 use a silicon carbide (SiC) material, and particularly, preferably uses a silicon carbide fiber-reinforced silicon carbide composite material (may be referred to as a SiC/SiC composite material) obtained by composing silicon carbide fiber in a matrix of silicon carbide. A material in which a SiC layer is further formed at a portion (for example, a region corresponding to a bonding surface between the two) of the surface of the SiC/SiC composite material is preferably used. A method of forming the SiC layer is not particularly limited. For example, a chemical vapor deposition method (CVD method) or a coating and sintering method may be used.

Dimensions of the fuel cladding tube 11 are preferably similar to those of the conventional fuel cladding tube formed of a zirconium alloy. For example, the length thereof is about 4 m, an outer diameter thereof is about 11 mm, and an inner thickness of the tube is about 1 mm. The end plug 12 (12a, 12b) has an insertion straight body portion 12c which is inserted into the fuel cladding tube 11, and a butting surface 12d which butts with the end surface of the fuel cladding tube 11. It is preferable that the end plug 12 (12a, 12b) has a shape and dimensions so as to cause a step not to be generated at an outer surface in the vicinity of the bonding portion when the end plug 12 is bonded to the fuel cladding tube 11. In order to easily insert the end plug 12 into the fuel cladding tube 11, it is preferable that an outer diameter of the insertion straight body portion 12c is formed to be smaller than an inner diameter of the fuel cladding tube 11 by appropriate margin (for example, about 0.02 to 0.5 mm).

As illustrated in FIG. 2A, the fuel cladding tube 11 and the end plug 12a are bonded to each other by brazing with a metal bonding material 20 interposed, and/or diffusion bonding, so as to secure air tightness. As the metal bonding material 20, one selected from Si (melting point 1414° C.), Ti (melting point 1812° C.), Zr (melting point 1855° C.), a Si alloy, a Ti alloy, and a Zr alloy having a composition in which a solidus temperature is equal to or higher than 1200° C. may be preferably used. Bonding is performed by using the metal bonding material 20 which has a melting temperature (temperature at which a liquid phase is generated) of 1200° C. or higher, and thus it is possible to hold air tightness of the fuel rod 10 even though an accident, for example, in which the temperature of the fuel rod reaches 1200° C. occurs.

In the invention, since the fuel cladding tube 11 and the end plug 12 are bonded to each other with the metal bonding material 20 interposed, it may be difficult that "brazing" and "diffusion bonding" are completely and microscopically distinguished from each other. Thus, in this specification, an expression of "brazing and/or diffusion bonding" is used on the premise that heating welding is performed with the metal bonding material 20 interposed.

Bonding between the fuel cladding tube 11 and the end plug 12 is, for example, performed as follows.

Firstly, a coating film of the metal bonding material 20 is formed on any one or both of a surface of the fuel cladding tube 11 and a surface of the end plug 12, which are desired to be bonded to each other (for example, an end surface of the fuel cladding tube 11 and an inner surface at the end portion of the fuel cladding tube 11, and the insertion straight body portion 12c and the butting surface 12d of the end plug 12). The coating film thickness is preferably a degree (for example, about 0.01 to 0.25 mm) having the above-described margin (gap between an inner diameter of the fuel cladding tube 11 and an outer diameter of the insertion straight body portion 12c). Thus, it is possible to prevent rattling or falling of the end plug 12 when the end plug 12 is inserted into the fuel cladding tube 11. A film forming method of the coating film of the metal bonding material 20 is not particularly limited, and the conventional method (for example, a deposition method, a spraying method, a cold spraying method, and a melting method) may be used.

Then, heating and bonding are performed while the fuel cladding tube 11 and the end plug 12 are pressed. Generally, one end portion of the fuel cladding tube 11 is bonded to one (12a or 12b) of the end plug in a state where the fuel pellets 13 are not loaded. The other end thereof is bonded to the other end plug after the fuel pellets 13 are loaded. In a case where bonding is performed in the state where the fuel pellets 13 are not loaded, it is possible to heat the entirety of the fuel cladding tube 11 including the bonding portion to the end plug 12. In a case where bonding is performed after the fuel pellets 13 are loaded, the bonding portion is locally heated so as not to heat the fuel pellets 13. A heating method is not particularly limited, and the conventional method (for example, whole heating using a long heating furnace, local heating using a laser, a high-frequency wave, or a local heater) can be used.

In a case where Ti, a Ti alloy, Zr, and a Zr alloy are used as the metal bonding material 20, some of C components may be deprived from SiC of the fuel cladding tube 11 and the end plug 12 at a bonding interface. Thus, Ti carbide or Zr carbide may be generated. As a result, a region in which the percentage of C is lower than that of SiC in a stoichiometry composition in the vicinity of the bonding interface (as a result, the percentage of Si is high) may be provided. In a case where Si and a Si alloy are used as the metal bonding material 20, naturally, a region in which the percentage of SiC is larger than that of Si in the stoichiometry composition in the vicinity of the bonding interface is provided.

SiC in the stoichiometry composition has significantly high oxidation resistance, but Si singleton is an easily-oxidizable material. Thus, if the Si component is excessively provided in the region of the bonding portion, it is concerned that the excessive Si component is oxidized and corroded (oxidized and dissolved) under a normal operation environment (for example, in reactor water of 280° C. to 330° C.) of a light-water reactor. In other words, if the bonding portion between the fuel cladding tube 11 and the end plug 12 is directly brought into contact with the reactor water, durability of the bonding portion (that is, long-term reliability of the fuel rod 10) may be degraded. Accordingly, in the invention, in order to prevent direct contact of the bonding portion with the reactor water, the outer surface of the bonding portion, and a portion of the outer surface of the fuel cladding tube 11 and the end plug 12, which is adjacent to the outer surface of the bonding portion are covered by the bonding-portion coating 14 formed from coating metal which has high corrosion resistance against high-temperature water. Water having high purity (temperature 288° C.) is used as the reactor water in a boiling-water type nuclear reactor (BWR), and water in which lithium and boric acid are added (temperature 325° C.) is used as the reactor water in a pressurized-water type nuclear reactor (PWR).

One selected from Ti, a Ti alloy, Zr, and a Zr alloy having high corrosion resistance under a normal operation environment of a light-water reactor may be preferably used as the coating metal. The thickness of the bonding-portion coating 14 is preferably 0.1 mm to 1 mm, and more preferably 0.2 mm to 0.5 mm. If the thickness of the bonding-portion coating 14 is set to be less than 0.1 mm, an effect as anti-corrosion coating becomes insufficient. If the thickness of the bonding-portion coating 14 is set to be more than 1 mm, an outer diameter of that portion becomes excessively large. Thus, a probability of affecting a flow of cooling water is increased.

A method of forming the bonding-portion coating 14 is not particularly limited as long as the bonding-portion coating 14 is formed by high adhesiveness to an undercoat base (the outer surface of the bonding portion and a portion of the outer surface of the fuel cladding tube 11 and the end plug 12, which is adjacent to the outer surface of the bonding portion). The conventional method (for example, a deposition method, a spraying method, and a cold spraying method) may be used.

In the metal bonding material 20 and the bonding-portion coating 14 used in the invention, an average linear expansion coefficient is preferably less than 10 ppm/K. A material having an average linear expansion coefficient which is smaller than the average linear expansion coefficient (4.3 to 6.6 ppm/K) of the SiC material functioning as a bonded material is used as the metal bonding material 20 and the bonding-portion coating 14. Thus, it is possible to suppress thermal stress generated by temperature fluctuation (thermal expansion and thermal contraction) of the fuel rod 10, up to the minimum, and to prevent breaking of the bonding portion and the bonding-portion coating 14. If the metal bonding material 20 or the bonding-portion coating 14 having an average linear expansion coefficient of 10 ppm/K or more is used, the effect is not obtained, and the long-term reliability as the entirety of the fuel rod 10 is damaged.

FIG. 2B is a schematic diagram of an enlarged section illustrating another example of the bonding portion between the fuel cladding tube and the end plug. FIG. 2C is a schematic diagram of an enlarged section illustrating still another example of the bonding portion between the fuel cladding tube and the end plug. As illustrated in FIGS. 2B and 2C, a butting surface 12d (if collectively called, a butting surface between the fuel cladding tube 11 and the end plug 12) between an end surface of the fuel cladding tube 11 and the end plug 12a is not limited to a case (see FIG. 2A) where a direction paralleled with the butting surface is parallel with an axial direction of the fuel cladding tube 11. The butting surface may have an inclined angle to the axial direction of the fuel cladding tube 11.

The butting surface between the fuel cladding tube 11 and the end plug 12 has an inclined angle, and thus axis alignment accuracy between the fuel cladding tube 11 and the end plug 12 is improved. In addition, a bonding area on the butting surface is increased, and thus it is possible to improve bonding strength or reliability of air tightness. In order to show the above effects, the inclined angle is preferably 5° to 60° to the axial direction of the fuel cladding tube 11. In a case of an inclined angle which is less than 5°, an effect of improving axis alignment accuracy is obtained. However, an effect of increasing the bonding area is shown very small. If the inclined angle is set to be more than 60°, cracks easily occur at a tip end portion of the butting surface.

FIG. 2D is a schematic diagram of an enlarged section illustrating still another example of the bonding portion between the fuel cladding tube and the end plug. In an embodiment illustrated in FIG. 2D, an inner surface of the fuel cladding tube 11 and the outer surface of the insertion straight body portion 12c of the end plug 12a have a screw structure 12e. The fuel cladding tube 11 and the end plug 12 are mechanically fastened by the screw structure 12e, and thus it is possible to more improve reliability of bonding strength. If the inner thickness of the fuel cladding tube 11 is considered, the screw structure 12e is desirably a loose screw structure (for example, altitude is low, and a screw pitch is wide). Even when a loose screw structure is provided, a sufficient effect is shown as long as the fuel cladding tube 11 or the end plug 12 is not fallen.

(Fuel Assembly)

FIG. 3 is a schematic diagram illustrating an example of a fuel assembly according to the invention. FIG. 3(a) illustrates a longitudinal section, and FIG. 3(b) illustrates a cross-section of line A-A. A fuel assembly 30 illustrated in FIGS. 3(a) and 3(b) is an example of a fuel assembly for a boiling-water type nuclear reactor (BWR). The fuel assembly 30 includes an upper tie plate 31, a lower tie plate 32, a plurality of fuel rods 10 and a water rod 33 having both ends which are respectively supported by the upper and lower tie plates 31 and 32, a fuel support lattice (spacer) 34 which bundles the fuel rods 10 and the water rod 33, and a channel box 35 which surrounds a fuel rod bundle attached to the upper tie plate 31. Briefly, the fuel rods 10 (also referred to as a full-length fuel rod), a partial length fuel rod 36, and the water rod 33 are bundled so as to have a square lattice shape, and are accommodated in the channel box 35 having a cross-section which is square-cylindrical (see FIG. 3(b)).

The partial length fuel rod 36 is one type of a nuclear reactor fuel rod and is a fuel rod which has an inner fuel effective length shorter than that of the fuel rod (full-length fuel rod) 10 and has a height which does not reach the upper tie plate 31. A handle 37 is fastened to the upper tie plate 31. If the handle 37 is lifted up, the entirety of the fuel assembly 30 can be pulled up.

In the fuel assembly 30 according to the invention, the same rod (zirconium alloy water rod) as that in the related art may be used as the water rod 33. However, if the loss-of-coolant accident is assumed, it is preferable that the water rod 33 also have a configuration similar to that of the fuel rod 10 in the invention (a hollow tube and an end plug which are formed of a SiC material are provided, the hollow tube and the end plug are bonded to each other with the metal bonding material 20 interposed, and the surrounding of the bonding portion is covered by the bonding-portion coating 14).

FIG. 4 is a schematic diagram of a cross-section illustrating an example of a cell of a boiling-water type nuclear reactor. As illustrated in FIG. 4, in a cell 40 of a BWR, four fuel assemblies 30 are disposed so as to have a square shape, and a control rod 41 having a cross-shaped cross-section is arranged at the center portion thereof. The cell 40 uses the nuclear reactor fuel rod 10 and the fuel assembly 30 according to the invention, and thus it is possible to hold long-term reliability which is equivalent to that in the related art, under a normal operation environment, and to improve safety when an accident (for example, loss-of-coolant accident) occurs.

FIG. 5 is a perspective schematic diagram illustrating another example of the fuel assembly according to the invention. A fuel assembly 50 illustrated in FIG. 5 is an example of a fuel assembly for a pressurized-water type nuclear reactor (PWR). The fuel assembly 50 includes a plurality of fuel rods 10, a plurality of control-rod guide thimbles 51, an incore instrumentation guide thimble 52, a plurality of support lattices (spacers) 53, an upper nozzle 54, and a lower nozzle 55. The support lattice bundles and supports the fuel rods and the control-rod guide thimble. The upper nozzle 54 and the lower nozzle 55 are constituent members of a skeleton of the fuel assembly 50, and have a function of positioning of the fuel assembly 50 or securing of a flow passage for cooling water in a reactor core.

FIG. 6 is a schematic diagram of a cross-section illustrating an example of a cell of a pressurized-water type nuclear reactor. As illustrated in FIG. 6, in a cell 60 of a PWR, a control rod is arranged in the center of the fuel assembly 50. Thus, four fuel assemblies 50 themselves are disposed so as to have a square shape. The cell 60 also uses the nuclear reactor fuel rod 10 and the fuel assembly 50 according to the invention, and thus it is possible to hold long-term reliability which is equivalent to that in the related art, under a normal operation environment, and to improve safety when an accident (for example, loss-of-coolant accident) occurs.

EXAMPLES

The invention will be more specifically described below by using examples. The invention is not limited to the following examples.

(Bonding Test of SiC Material by Using Metal Bonding Material)

Plural types of metal bonding materials were prepared, and a bonding test between SiC plates was performed. As the SiC plate, a plate in which a SiC layer was formed on the surface was used. Table 1 shows specifications of the prepared metal bonding materials.

TABLE 1

Specifications of metal bonding materials

| | Material | Composition (mass %) | Solidus temperature (° C.) | Average linear expansion coefficient (ppm/K) |
|---|---|---|---|---|
| Bonded material | SiC | | 2730 | 4.3-6.6 |
| Example 1 | Si | C: 0.08% or less, Si: remainder | 1404-1414 | 3.3 |
| Example 2 | Si alloy | Ge: 50% or less, C: 0.08% or less, Si: remainder | 1200-1414 | 3.5-5.0 |
| Example 3 | | Mo: 5% or less, W: 20% or less, Fe: 40% or less, Si: remainder | 1207-1414 | 3.5-4.0 |
| Example 4 | | Ti: 2% or less, Zr: 2% or less, Ta: 2% or less, Nb: 2% or less, V: 2% or less, Y: 2% or less, Cr: 2% or less, Si: remainder | 1242-1414 | 3.5-4.0 |
| Example 5 | Ti | Fe: 0.3% or less, C: 0.08% or less, Ti: remainder | 1635-1656 | 8.6 |
| Example 6 | Ti alloy | Zr: 50%, Fe: 0.3% or less, C:0.08% or less, Ti: remainder | 1480-1553 | 7.5 |
| Example 7 | Zr | Fe: 0.3% or less, C: 0.08% or less, Zr: remainder | 1740-1855 | 5.7 |
| Example 8 | Zr alloy | Sn: 1.2-1.7%, Ni: 0.03-0.08%, Fe: 0.07-0.2%, Cr: 0.05-0.15%, Ti: 0.005% or less, Zr: remainder | 1643-1744 | 6.5 |
| Example 9 | | Sn: 1.2-1.7%, Fe: 0.18-0.24%, Cr: 0.07-0.13%, Ti: 0.005% or less, Zr: remainder | 1656-1706 | 6.5 |
| Example 10 | | Nb: 1-2.5%, Ti: 0.005% or less, Zr: remainder | 1811-1853 | 6.5 |
| Comparative Example 1 | Ni alloy | Cr: 20%, Si: 8%, B: 3% or less, C: 0.1% or less, P: 0.02% or less, Ni: remainder | 1040-1060 | 14.8 |
| Comparative Example 2 | | Cr: 18-19.5%, Si: 9.75-10.5%, B: 0.03% or less, C: 0.1% or less, P: 0.02% or less, Ni: remainder | 1080-1135 | 14.8 |
| Comparative Example 3 | Si alloy | Al: 19.6%, Cu: 0.04%, Si: remainder | 577 | 7.6 |

Two sheets of SiC plates in which a SiC layer was formed on the surface were prepared, and a film (thickness of about 0.1 mm) of a metal bonding material was formed on one surface of each of the two sheets by a deposition method. Then, the two sheets of SiC plates overlapped each other so as to cause the formed metal bonding material coating films to face each other, and pressing and heating treatment (in an argon air flow) was performed by using an electric furnace. A heating temperature in Examples 1 and 4 was set to be 1450° C. to 1514° C. The heating temperature in Examples 2 and 3 was set to be 1250° C. to 1514° C. The heating temperature in Examples 5 to 10 was set to be 1200° C. to 1400° C. The heating temperature in Comparative Examples 1 and 2 was set to be 1170° C. to 1250° C. The heating temperature in Comparative Example 3 was set to be 1350° C. to 1400° C. After heating bonding, a section of a bonding portion was polished, and a microstructure of the bonding portion region was observed by using an optical microscope.

As a result obtained by observing the microstructure of the bonding portion region, in Examples 1 to 4, Comparative Example 3 (Si and Si alloy), and Comparative Examples 1 and 2 (Ni alloy), a microstructure (brazing structure) in which brazing is the subject was observed. In Examples 5 to 10 (Ti, a Ti alloy, Zr, and a Zr alloy), a microstructure (diffusion bonding structure) in which diffusion bonding is the subject was observed. However, in Comparative Examples 1 and 2 (Ni alloy), cracks in the metal bonding material in a direction vertical to a bonding interface were observed. It was considered that this was because large tensile stress was applied to the metal bonding material side during cooling after heating bonding, due to a large average linear expansion coefficient in Comparative Examples 1 and 2 (Ni alloy) (strictly, resulted from a large difference of an average linear expansion coefficient between SiC and Comparative Examples 1 and 2). In other samples (Examples 1 to 10 and Comparative Example 3), cracks or concatenated bubbles were not observed in the bonding portion region.

In Example 3, because an added element (Mo, W, and Fe) in a Si alloy does not form carbide which is chemically more stable than SiC, it is expected that the added element contributes to improvement of mechanical strength of a bonding layer without depriving the C component from a SiC material at a time of heating bonding. In Example 4, an added element (Ti, Zr, Ta, Nb, V, Y, and Cr) in a Si alloy forms carbide which is chemically more stable than SiC. However, the content of each added element is appropriately controlled, and thus it is expected that the added element forms an appropriate reactive layer at a bonding interface, and contributes to improvement of bonding strength. In Comparative Example 3, a problem was not observed when a microstructure was observed. However, because the solidus temperature is 577° C., that is, low, it is considered that a problem occurs in a viewpoint of heat resistance.

(High-Temperature Water Corrosion Test of Bonding-Portion Coating)

Plural types of coating metals were prepared, and bonding-portion coating was formed on a plate of a SiC/SiC composite material. Then, a high-temperature water corrosion test was performed. Table 2 shows specifications of the prepared coating metal.

TABLE 2

Specifications of coating metals

| | Material | Composition (mass %) | Average linear expansion coefficient (ppm/K) |
|---|---|---|---|
| Example 11 | Zr alloy | Sn: 1.2-1.7%, Fe: 0.07-0.2%, Cr: 0.05-0.15%, Ni: 0.03-0.08%, Ti: 0.005% or less, Zr: remainder | 6.5 |
| Example 12 | | Sn: 1.2-1.7%, Fe: 0.18-0.24%, Cr: 0.07-0.13%, Ti: 0.005% or less, Zr: remainder | 6.5 |
| Example 13 | | Nb: 1-2.5%, Ti: 0.005% or less, Zr: remainder | 6.5 |
| Example 14 | Ti alloy | Pd: 0.12-0.25%, Fe: 0.3% or less, C: 0.08% or less, Ti: remainder | 8.4 |
| Example 15 | | Zr: 37.5%, Cu: 15%, Ni: 10%, Ti: remainder | 9.4 |
| Example 16 | | Zr: 37.5%, Cu: 25%, Ti: remainder | 9.7 |

TABLE 2-continued

Specifications of coating metals

| | Material | Composition (mass %) | Average linear expansion coefficient (ppm/K) |
|---|---|---|---|
| Example 17 | | Zr: 37.5%, Ni: 25%, Ti: remainder | 9.0 |
| Example 18 | Ti | Fe: 0.3% or less, C: 0.08% or less, Ti: remainder | 8.6 |
| Comparative Example 4 | Al | Si: 0.25% or less, Fe: 0.4% or less, Al: remainder | 23.1 |
| Comparative Example 5 | Si | C: 0.08% or less, Si: remainder | 3.3 |
| Comparative Example 6 | Ni alloy | Fe: 3% or less, Cr: 18-22%, Nb: 2-3%, Ti: 0.75% or less, Cu: 0.5% or less, C: 0.1% or less, Ni: remainder | 14.8 |

A film of bonding-portion coating (thickness of about 0.2 mm) was formed on a surface of the plate of a SiC/SiC composite material by a deposition method or a spraying method. A normal operation environment of a BWR was simulated, and a high-temperature water corrosion test was performed. As test conditions, immersion was performed for 500 hours in high-temperature water having a temperature of 288° C., dissolved oxygen concentration of 8 ppm, electric conductivity of being less than 0.1 μS/cm. Then, a mass change was measured. FIG. 7 illustrates results.

FIG. 7 is a graph illustrating results of the high-temperature water corrosion test in Comparative Examples 4 to 6 and Examples 11 and 15 to 18. A mass increase in the high-temperature water corrosion test means oxidization or hydroxylation of coating metal by the high-temperature water. A mass decrease means dissolution into the high-temperature water. As illustrated in FIG. 7, in Comparative Example 4 (Al), aluminum hydroxide oxide (AlO(OH)) was generated, and thus a large mass increase was observed. In Comparative Example 5 (Si), dissolution after silicon oxide ($SiO_2$) was generated caused a large mass decrease to be observed. From the results of Comparative Examples 4 and 5, it was confirmed that Al or Si had a problem in corrosion resistance under a normal operation environment of a nuclear reactor.

In Comparative Example 6 (Ni alloy), and Examples 11 and 15 to 18 (Zr alloy, Ti alloy, and Ti), the mass change was very small. It is said that the mass change (corrosion) permitted as a material used in a fuel rod is set to be equal to or less than ±1.0 mg/cm² under a normal operation environment of a nuclear reactor. The materials sufficiently satisfied the requirement.

However, the bonding-portion coating in the invention is formed on a bonding portion between a SiC material and a SiC material. Thus, as described above, it is necessary that a difference in a linear expansion coefficient from the SiC material is set to be small. In this viewpoint, in Comparative Example 6 (Ni alloy), since the average linear expansion coefficient is large, it is concerned that bonding-portion coating using this material is fatigue-broken by a heat cycle of a fuel rod. That is, a Ni alloy having a large average linear expansion coefficient may not be used as the bonding-portion coating in the invention.

The above-described embodiment is specifically described for understanding of the invention. The invention is not limited to including the all of the described component. For example, some of the components in a certain embodiment may be replaced with components in another embodiment, or components in another embodiment may be added to the configuration of a certain embodiment. Further, regarding some of components of each embodiment, deletion, replacement with other components, and addition of other components may be performed.

REFERENCE SIGNS LIST

10 NUCLEAR REACTOR FUEL ROD
11 FUEL CLADDING TUBE
12, 12a, 12b END PLUG
12c INSERTION STRAIGHT BODY PORTION
12d BUTTING SURFACE
12e SCREW STRUCTURE
13 FUEL PELLET
14 BONDING-PORTION COATING
15 PLENUM SPRING
20 METAL BONDING MATERIAL
30 FUEL ASSEMBLY
31 UPPER TIE PLATE
32 LOWER TIE PLATE
33 WATER ROD
34 FUEL SUPPORT LATTICE
35 CHANNEL BOX
36 PARTIAL LENGTH FUEL ROD
37 HANDLE
40 CELL
41 CONTROL ROD
50 FUEL ASSEMBLY
51 CONTROL-ROD GUIDE THIMBLE
52 INCORE INSTRUMENTATION GUIDE THIMBLE
53 SUPPORT LATTICE
54 UPPER NOZZLE
55 LOWER NOZZLE
60 CELL

The invention claimed is:

1. A nuclear reactor fuel rod for light-water reactor, comprising:
a fuel cladding tube; and
an end plug, the end plug having an insertion straight body portion and a butting surface, the insertion straight body portion being inserted into the fuel cladding tube, the butting surface butts with an end surface of the fuel cladding tube,
wherein both of the fuel cladding tube and the end plug are composed of a silicon carbide material,
a bonding portion between the fuel cladding tube and the end plug is formed by brazing and/or by diffusion bonding with a predetermined metal bonding material interposed, the predetermined metal bonding material having a solidus temperature of 1200° C. or higher,
an outer surface of the bonding portion, and a portion of an outer surface of the fuel cladding tube and the end plug, which is adjacent to the outer surface of the bonding portion are covered by bonding-portion coating formed of a predetermined coating metal, and
the predetermined metal bonding material and the predetermined coating metal have an average linear expansion coefficient which is less than 10 ppm/K.

2. The nuclear reactor fuel rod according to claim 1, wherein the predetermined metal bonding material is one selected from silicon, a silicon alloy, titanium, a titanium alloy, zirconium, and a zirconium alloy, and
the predetermined coating metal is one selected from titanium, a titanium alloy, zirconium, and a zirconium alloy.

3. The nuclear reactor fuel rod according to claim 1, wherein a thickness of the bonding-portion coating is 0.1 mm to 1 mm.

4. The nuclear reactor fuel rod according to claim 1, wherein the silicon carbide material is a silicon carbide fiber-reinforced silicon carbide composite material obtained by composing silicon carbide fiber in a matrix of silicon carbide.

5. The nuclear reactor fuel rod according to claim 4, wherein the silicon carbide material is a material in which a silicon carbide layer is further formed at a portion of a surface of the silicon carbide fiber-reinforced silicon carbide composite material.

6. The nuclear reactor fuel rod according to claim 1, wherein the butting surface between the fuel cladding tube and the end plug at the bonding portion is formed to cause a direction paralleled with the butting surface to be inclined to an axial direction of the fuel cladding tube at an angle of 5° to 60°.

7. The nuclear reactor fuel rod according to claim 1, wherein the fuel cladding tube and the end plug are fastened further by a screw structure.

8. The nuclear reactor fuel rod according to claim 2, wherein a thickness of the bonding-portion coating is 0.1 mm to 1 mm.

9. The nuclear reactor fuel rod according to claim 2, wherein the silicon carbide material is a silicon carbide fiber-reinforced silicon carbide composite material obtained by composing silicon carbide fiber in a matrix of silicon carbide.

10. The nuclear reactor fuel rod according to claim 3, wherein the silicon carbide material is a silicon carbide fiber-reinforced silicon carbide composite material obtained by composing silicon carbide fiber in a matrix of silicon carbide.

11. The nuclear reactor fuel rod according to claim 8, wherein the silicon carbide material is a silicon carbide fiber-reinforced silicon carbide composite material obtained by composing silicon carbide fiber in a matrix of silicon carbide.

12. The nuclear reactor fuel rod according to claim 9, wherein the silicon carbide material is a material in which a silicon carbide layer is further formed at a portion of a surface of the silicon carbide fiber-reinforced silicon carbide composite material.

13. The nuclear reactor fuel rod according to claim 10, wherein the silicon carbide material is a material in which a silicon carbide layer is further formed at a portion of a surface of the silicon carbide fiber-reinforced silicon carbide composite material.

14. The nuclear reactor fuel rod according to claim 11, wherein the silicon carbide material is a material in which a silicon carbide layer is further formed at a portion of a surface of the silicon carbide fiber-reinforced silicon carbide composite material.

15. The nuclear reactor fuel rod according to claim 2, wherein the butting surface between the fuel cladding tube and the end plug at the bonding portion is formed to cause a direction paralleled with the butting surface to be inclined to an axial direction of the fuel cladding tube at an angle of 5° to 60°.

16. The nuclear reactor fuel rod according to claim 3, wherein the butting surface between the fuel cladding tube and the end plug at the bonding portion is formed to cause a direction paralleled with the butting surface to be inclined to an axial direction of the fuel cladding tube at an angle of 5° to 60°.

17. The nuclear reactor fuel rod according to claim 4, wherein the butting surface between the fuel cladding tube and the end plug at the bonding portion is formed to cause a direction paralleled with the butting surface to be inclined to an axial direction of the fuel cladding tube at an angle of 5° to 60°.

18. The nuclear reactor fuel rod according to claim 5, wherein the butting surface between the fuel cladding tube and the end plug at the bonding portion is formed to cause a direction paralleled with the butting surface to be inclined to an axial direction of the fuel cladding tube at an angle of 5° to 60°.

19. The nuclear reactor fuel rod according to claim 8, wherein the butting surface between the fuel cladding tube and the end plug at the bonding portion is formed to cause a direction paralleled with the butting surface to be inclined to an axial direction of the fuel cladding tube at an angle of 5° to 60°.

20. The nuclear reactor fuel rod according to claim 9, wherein the butting surface between the fuel cladding tube and the end plug at the bonding portion is formed to cause a direction paralleled with the butting surface to be inclined to an axial direction of the fuel cladding tube at an angle of 5° to 60°.

21. The nuclear reactor fuel rod according to claim 10, wherein the butting surface between the fuel cladding tube and the end plug at the bonding portion is formed to cause a direction paralleled with the butting surface to be inclined to an axial direction of the fuel cladding tube at an angle of 5° to 60°.

22. The nuclear reactor fuel rod according to claim 11, wherein the butting surface between the fuel cladding tube and the end plug at the bonding portion is formed to cause a direction paralleled with the butting surface to be inclined to an axial direction of the fuel cladding tube at an angle of 5° to 60°.

23. The nuclear reactor fuel rod according to claim 12, wherein the butting surface between the fuel cladding tube and the end plug at the bonding portion is formed to cause a direction paralleled with the butting surface to be inclined to an axial direction of the fuel cladding tube at an angle of 5° to 60°.

24. The nuclear reactor fuel rod according to claim 13, wherein the butting surface between the fuel cladding tube and the end plug at the bonding portion is formed to cause a direction paralleled with the butting surface to be inclined to an axial direction of the fuel cladding tube at an angle of 5° to 60°.

25. The nuclear reactor fuel rod according to claim 14, wherein the butting surface between the fuel cladding tube and the end plug at the bonding portion is formed to cause a direction paralleled with the butting surface to be inclined to an axial direction of the fuel cladding tube at an angle of 5° to 60°.

26. A fuel assembly configured by bundling a plurality of nuclear reactor fuel rods,
wherein the nuclear reactor fuel rod is the nuclear reactor fuel rod according to claim 1.

* * * * *